(12) United States Patent
Endo et al.

(10) Patent No.: US 12,259,083 B2
(45) Date of Patent: Mar. 25, 2025

(54) MULTILAYER TUBE FOR AUTOMOTIVE APPLICATIONS

(71) Applicant: Cooper-Standard Automotive, Inc., Auburn Hills, MI (US)

(72) Inventors: Takahiro Endo, Ibaraki (JP); Tao Nie, Rochester Hills, MI (US); Yingping Zhang, Oakland, MI (US); He Wenbao, Suzhou (CN)

(73) Assignee: Cooper-Standard Automotive Inc., Northville, MI (US)

( * ) Notice: Subject to any disclaimer, the term of this patent is extended or adjusted under 35 U.S.C. 154(b) by 0 days.

(21) Appl. No.: 17/714,922

(22) Filed: Apr. 6, 2022

(65) Prior Publication Data

US 2023/0304610 A1 Sep. 28, 2023

(51) Int. Cl.
*F16L 9/12* (2006.01)
*B32B 1/08* (2006.01)
*B32B 7/12* (2006.01)
*B32B 27/34* (2006.01)

(52) U.S. Cl.
CPC ............... *F16L 9/121* (2013.01); *B32B 1/08* (2013.01); *B32B 7/12* (2013.01); *B32B 27/34* (2013.01); *B32B 2250/03* (2013.01); *B32B 2250/24* (2013.01); *B32B 2307/308* (2013.01); *B32B 2597/00* (2013.01)

(58) Field of Classification Search
CPC ... F16L 9/121; B32B 1/08; B32B 7/12; B32B 27/34; B32B 2250/03; B32B 2250/24; B32B 2597/00
See application file for complete search history.

(56) References Cited

U.S. PATENT DOCUMENTS

| | | | | | |
|---|---|---|---|---|---|
| 5,093,423 | A | * | 3/1992 | Bayan | C08L 9/06 525/95 |
| 5,507,320 | A | * | 4/1996 | Plumley | F16L 11/125 138/123 |
| 6,475,582 | B1 | * | 11/2002 | Phan | C08L 51/06 428/36.9 |
| 8,389,615 | B2 | * | 3/2013 | Tse | C08L 23/10 525/98 |
| 10,513,601 | B2 | * | 12/2019 | Chen | C08L 23/16 |
| 10,724,659 | B2 | * | 7/2020 | Peters | F16L 11/04 |
| 10,920,053 | B2 | * | 2/2021 | Abubakar | C08L 23/12 |
| 2006/0293453 | A1 | * | 12/2006 | Jiang | C08F 210/06 525/191 |

(Continued)

FOREIGN PATENT DOCUMENTS

JP 6970371 B2 11/2021

OTHER PUBLICATIONS

Search Report for EP23163344.7 dated Jul. 27, 2023.

*Primary Examiner* — David R Deal
(74) *Attorney, Agent, or Firm* — Paschall & Associates, LLC; Mark Goldberg

(57) ABSTRACT

A multilayer tube is provided for use in with transmission oil or heating and cooling fluid applications in motor vehicles. The multilayer tube has an outer layer comprising an aliphatic or an aromatic polyamide to provide protection from the outside environment; a middle layer of a lower cost material that comprises from 20-90% of the thickness of the tube materials; and an inner layer that has excellent resistance to transmission oil or glycol coolant and temperature.

8 Claims, 4 Drawing Sheets

(56) References Cited

U.S. PATENT DOCUMENTS

| | | | |
|---|---|---|---|
| 2007/0213431 A1* | 9/2007 | Adur | C08F 255/00 |
| | | | 524/588 |
| 2010/0086717 A1* | 4/2010 | Van Den Broeck | C22C 21/02 |
| | | | 428/35.9 |
| 2011/0082258 A1* | 4/2011 | Walton | C08F 297/083 |
| | | | 525/88 |
| 2014/0309358 A1* | 10/2014 | Jacob | C08L 23/10 |
| | | | 525/232 |
| 2017/0275443 A1* | 9/2017 | Datta | C08L 23/14 |
| 2018/0162971 A1* | 6/2018 | Chen | C08F 110/06 |
| 2022/0063255 A1* | 3/2022 | Tsuboi | B32B 1/08 |

* cited by examiner

MULTILAYER TUBE FOR AUTOMOTIVE APPLICATIONS

CROSS-REFERENCE TO RELATED APPLICATIONS

This application claims priority from Chinese Application No. 202210291084.6, filed Mar. 23, 2022, which is incorporated herein in its entirety.

BACKGROUND

The present invention relates to a multilayer tube for transferring or conveying a liquid such as transmission oil or liquids for heating and cooling applications for vehicles and machines equipped with a motor or engine.

There are multilayer tubes that are known to be used in vehicles such as a multilayered tube discussed in US Patent Application Pub. US2021/0252822 which covers a five-layer tube made from polyamides that is used to transfer fluids such as fuels in vehicles. Multilayer tubes are able to provide a combination of properties that may be unavailable in a single material.

Typically, a multilayer tube is comprising an outer layer, an intermediate layer radially within the barrier layer, and an inner layer radially within the intermediate layer. Additional layers may be positioned between the outer layer and the intermediate layer or between the intermediate layer and the inner layer. It is important that the material in the tube has good chemical resistance to the fluid and that it withstands the temperatures experienced and that the chemical components in the fluid do not permeate through the tube to the environment. This is important both for avoiding a reduction in the quality of the fluid and to avoid the escape of volatile substances into the environment. In addition, it is important to avoid slow leaching or absorption of the fluid into the tube material.

One other concern is that the multilayer tube be cost competitive with alternative tubing used for the same function while maintaining the needed properties. It has been found that the use of a middle layer that maintains the needed physical properties but has a lower cost is an efficient way to meet the requirements for such tubes or lines in vehicles.

The present disclosure also relates to a method of manufacturing a multi-layer tube, particularly a multilayer tube as mentioned above.

Multilayer tubes are made for a number of purposes. One such purpose is sending transmission oil in transmission cooling systems where the temperatures may range from −40° C. to 150° C. Another purpose is conveying heating and cooling fluids in vehicle heating and cooling systems where the temperatures may range from −40 C to 130 C in continuous operation and up to 135 C at peak temperatures.

Multilayer tubes include multiple layers which address certain needs in such tubes.

For example, an outer protection layer is typically provided in order to protect the inner layers against harsh environments, as for example within an engine compartment of a motor vehicle. In these environments, both mechanical and heat stress can occur, but also the exposure to fluids like water, oil, etc. that should not intermix with the fluid that is guided within the multilayer tube.

On the other hand, the inner layer comes into contact with the fluid to be conveyed. The inner layer therefore needs to be compatible with or resistant to the fluid to be guided. The intermediate layer, typically, provides a certain rigidity and stability of the tube. Finally, the outer layer has the task to provide a barrier between the outside environment of the tube.

In view of the above, it is the object of the disclosure to provide an improved cost-efficient multilayer tube that meets the requirements for transferring of transmission oil or glycol coolant and the method of manufacturing such multilayer tube.

SUMMARY

This disclosure provides a multilayer tube comprising an outer layer of an aliphatic or an aromatic polyamide; a middle layer of aliphatic polyamides; and an inner layer of aliphatic polyamides or an aromatic polyamide. The inner layer comprises an aliphatic or aromatic polyamide such as PA610, PA612, PA1010, PA1012, PA9T, PPA or Nylon MXD6. The PPA in the inner layer may be a polymer selected from PA6T, PA6T/6I, PA6T/6, PA6T/66, PA9T and PA11T. The outer layer may comprise an aliphatic or an aromatic polyamide such as PA610, PA612, PA1010, PA1012 or PA9T similar to the inner layer. The middle layer is an aliphatic polyamide such as PA6, PA66, PA610, PA612, PA12 or PA11. The middle layer may be further comprising about 1-49 wt % elastomer. The multilayer tube may be used in a transmission cooling system at temperatures from −40 C to 150 C. The multilayer tube may have a smooth bore or a corrugated surface. The outer layer may be a polymer selected from PA610, PA612, PA1010, PA1012, PA9T, PPA or Nylon MXD6. The PPA may be a polymer selected from PA6T, PA6T/6I, PA6T/6, PA6T/66, PA9T and PA11T. The middle layer may be a polymer selected from PA6, PA66, PA610, PA612, PA12 or PA11. This middle layer is selected to lower the overall cost of the tube as compared to a tube made from a single polymer layer. The inner layer may be the same or different from the outer layer and be a polymer selected from PA610, PA612, PA1010, PA1012, PA9T, PPA or Nylon MXD6.

The multilayer tube may also be used in an automotive heating and cooling system at −40 C to 130 C in continuous operation and up to 135 C at peak temperatures, 150° C. The multilayer tube may have a smooth bore or a corrugated surface. The outer layer may be a polymer selected from PA9T or PPA. The middle layer may be a polymer selected from PA6, PA610, PA612, PA12 or PA11. This middle layer is selected to lower the overall cost of the tube as compared to a tube made from a single polymer layer. The inner layer may be the same or different from the outer layer and be a polymer selected from, PA610, PA612, PA1010, PA1012, PA9T, PPA or Nylon MXD6.

BRIEF DESCRIPTION OF THE SEVERAL VIEWS OF THE DRAWING

Exemplary embodiments of the disclosure are explained in more detail in the following description and are represented in the drawings, in which.

DETAILED DESCRIPTION

Figure 1:
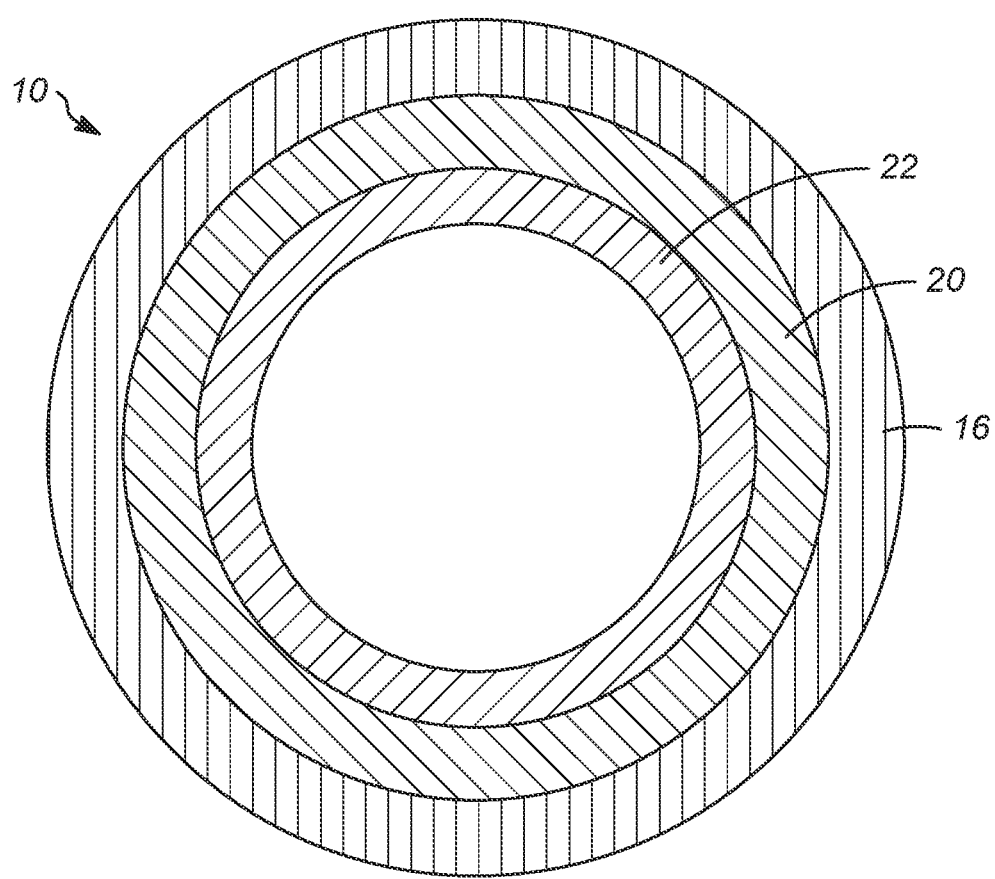
FIG. 1 shows a schematic cross section of a multilayer tube with three layers.

The disclosure provides a multilayer tube for conveying transmission oil or for conveying vehicle heating or cooling fluids, comprising an outer layer, an intermediate layer radially within the outer layer comprising an aliphatic polyamide, and an inner layer radially within the intermediate layer, wherein the layers are co-extruded layers.

Further, the multilayer tube is made by a method of manufacturing a multi-layer tube comprising the steps of providing an extrudable outer protection layer material for an outer protection layer, providing an extrudable intermediate layer material for an intermediate layer, providing an extrudable inner layer material for an inner layer, wherein the inner layer material comprises an aliphatic or an aromatic polyamide, and co-extruding at least two of the layers.

The middle layer is selected as a lower cost material in order to provide a significant cost saving in products yet retain the desired overall properties and performance.

The multilayer tube for transmission oil applications contains an aromatic or aliphatic polyamide used for the outer layer that can be any material selected from the group of PA610, PA612, PA1010, PA1012 PA9T, PPA or Nylon MXD6. The middle layer often contains an elastomer such as from about 1% to 49% elastomer by weight. The inner layer is selected to be a similar material as the outer layer such as PA610, PA612, PA1010, PA1012 PA9T, PPA or Nylon MXD6.

PA610 is a polyamide made from one monomer with six carbon atoms and the other monomer having ten carbon atoms which is made from hexamethylenediamine and sebacic acid. Similarly, PA612 is a copolymer of a linear 6C diamine and a 12C diacid. PA1010 is the polycondensation product of 1,10-decamethylene diamine and 1,10-decanedioic acid (sebacic). PA1012 is a biobased polyamide.

In another preferred embodiment, the intermediate layer comprises at least one of PA6, PA66, PA610, PA612, PA12 or PA11.

Due to the general ability to adhere between the outer protection layer and the barrier layer, an adhesive layer may be necessary between outer and middle layers or between inner and middle layers.

The aromatic or partially aromatic polyamide used for the outer layer of the multilayer tube for heating and cooling fluids can be any material selected from the group of PA610, PA612, PA1010, PA1012 PA9T, PPA or Nylon MXD6. The intermediate or middle layer is an aliphatic polyamide. The middle layer often contains an elastomer such as from about 1% to 49% elastomer by weight. The middle layer may be selected from PA6, PA612 or PA610, PA12 or PA11. The inner layer is selected to be a similar material as the outer layer such as PA610, PA612, PA1010, PA1012 PA9T, PPA or Nylon MXD6

The middle layer is selected to provide sufficient of the desired properties but especially at lower cost compared to the inner and outer layer materials that are more critical in being the surface that the fluid is conveyed through in the case of the inner layer or the layer that is exposed to the environment in the case of the outer layer. In addition, depending upon the materials selected for the layers, there may be a layer of adhesive between the outer layer and the middle layer and/or the middle layer and the inner layer.

It will be understood that the features of the disclosure mentioned above and those yet to be explained below can be used not only in the respective combination indicated, but also in other combinations or in isolation, without leaving the scope of the present invention.

Embodiments

A multilayer tube according to the disclosure is generally shown in FIG. 1 and given the reference numeral 10.

The multilayer tube 10 is provided in FIG. 1. There are three layers shown, an outer layer 16, a middle or intermediate layer 20 and an inner layer 22. The most effective manufacturing method for layers 16, 20 and 22 is coextrusion. The middle layer may be 20-90% of the thickness of the tube in some embodiments, 30-80% of the thickness in other embodiments.

Each of the above materials can be provided in grades that are adapted to the respective function.

The outer layer may comprise of materials such as PA610, PA612, PA1010 or PA1012, PA9T. The intermediate layer 20 may comprise at least one of PA6, PA66, PA610, PA612, PA12 or PA11. The inner layer 22 may comprise at least one of PA610, PA612, PA1010, PA1012, PA9T, PPA or Nylon MXD6. The intermediate layer is a material that costs less than the outer layer or the inner layer and is a material that adheres to those layers so that an adhesive is not necessary in the embodiment shown in FIG. 1.

Figure 2:
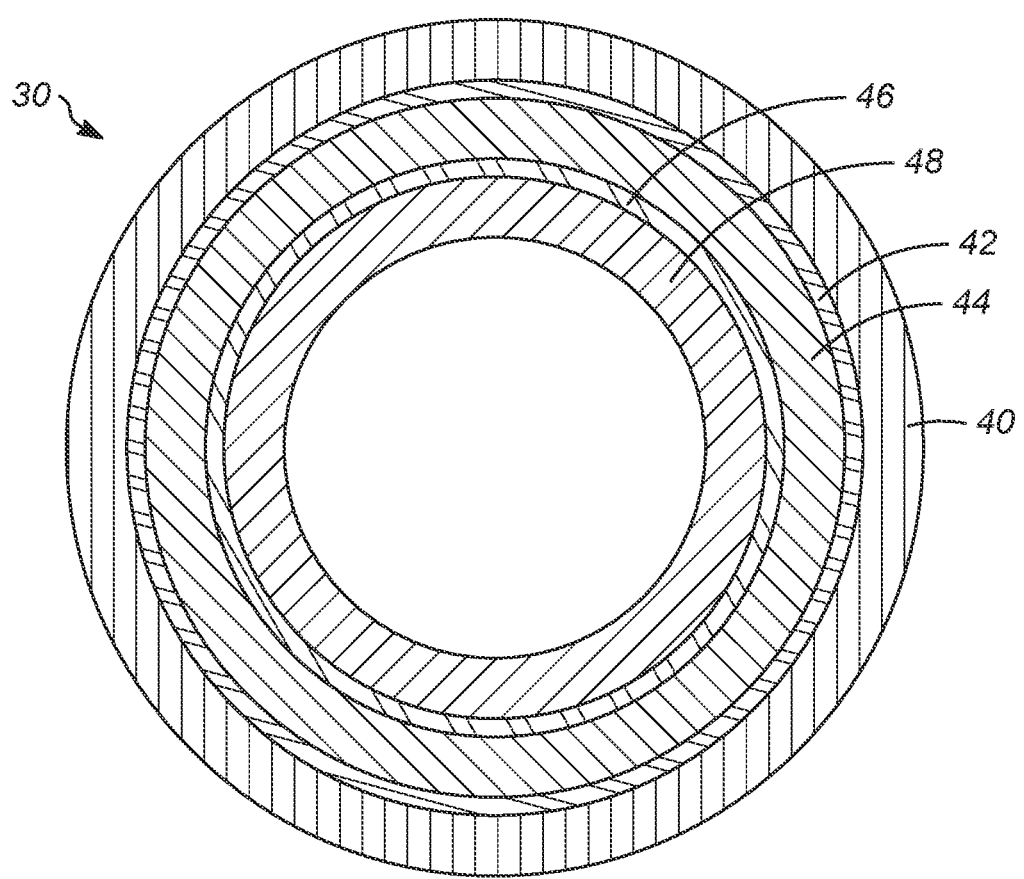
FIG. 2 shows a schematic cross section of a multilayer tube with five layers having a layer of adhesive between the outer and middle layer, and having a layer of adhesive between the middle and inner layer

A second embodiment is shown in FIG. 2 in which layers of adhesive are shown between the outer layer and intermediate layer as well as between the inner layer and the intermediate layer. The adhesive may be a polyamide or other known adhesive to adhere to the polyamides in the three main layers. In FIG. 2 is shown a tube 30 in cross section with an outer layer 40, then a layer of adhesive 42, an intermediate layer 44, an adhesive layer 46 and an inner layer 48. The middle layer may be 20-90% of the thickness of the tube in some embodiments, 30-80% of the thickness in other embodiments. Each of the above materials can be provided in grades that are adapted to the respective function. The outer layer 40 may comprise materials such as PA610, PA612, PA1010, PA1012, PA9T, PPA or Nylon MXD6. The intermediate layer 44 may comprise at least one of PA6, PA66, PA610, PA612, PA12 or PA11. The inner layer 48 may comprise at least one of PA610, PA612, PA1010, PA1012, PA9T, PPA or Nylon MXD6.

Figure 3:
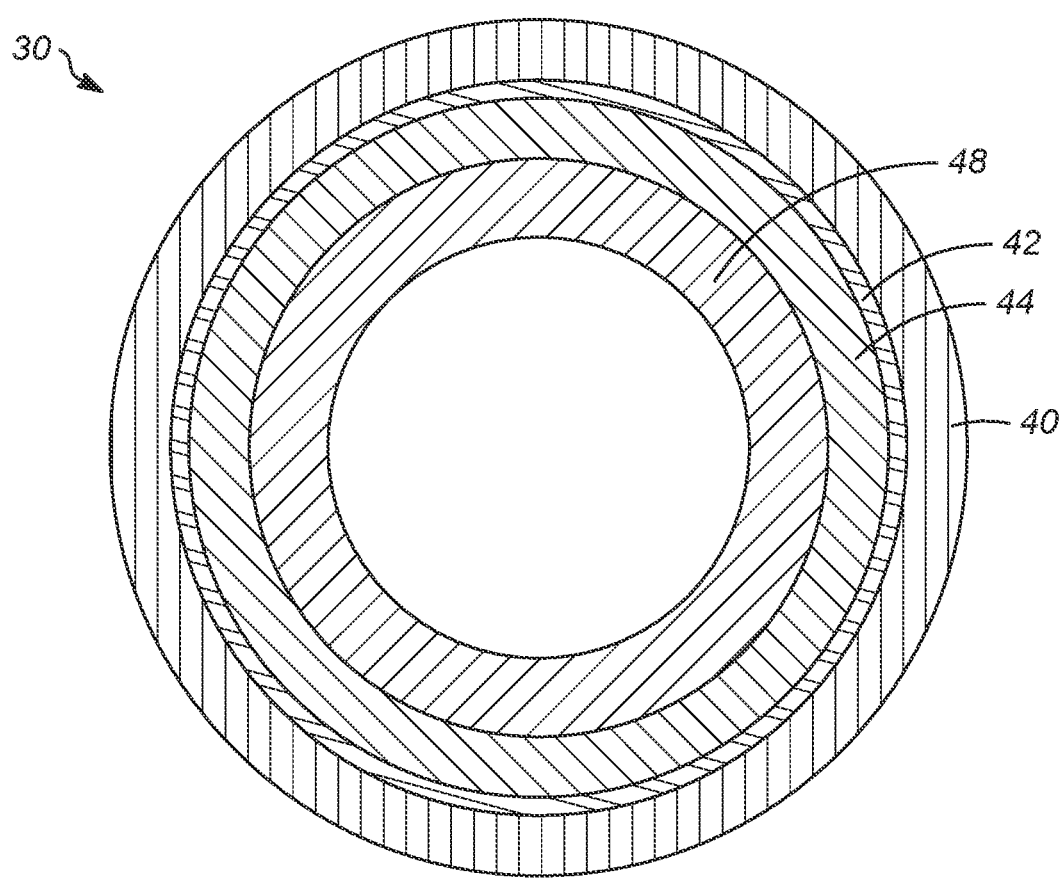
FIG. 3 shows a schematic cross section of a multilayer tube with four layers having a layer of adhesive between the outer and middle layer.
Figure 4:
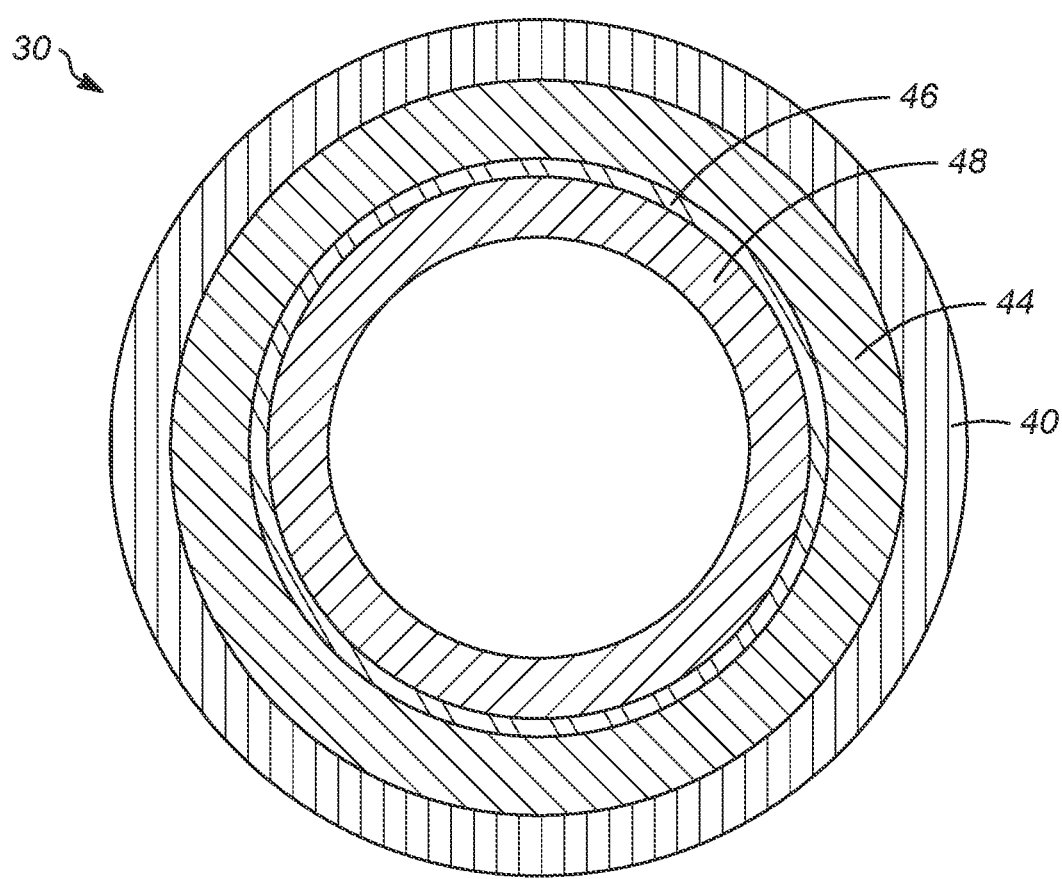
FIG. 4 shows a schematic cross section of a multilayer tube with four layers having a layer of adhesive between the middle and inner layer.

A third embodiment is shown in FIG. 3 which is identical to FIG. 2 except for the absence of adhesive layer 46. FIG. 4 shows a fourth embodiment that is identical to FIG. 2 except for the absence of adhesive layer 42.

The invention claimed is:

1. A multilayer tube comprising
an outer layer comprising an aliphatic polyamide;
a middle layer of aliphatic polyamide comprising from 20-90% of a combined thickness of three layers within said multilayer tube wherein the middle layer is a polyamide polymer selected from PA6, PA610 and PA612; and
an inner layer comprising an aliphatic polyamide and wherein a layer of adhesive is located between said inner layer and said middle layer.

2. The multilayer tube of claim 1 wherein said middle layer comprises about 30-80% of said combined thickness.

3. The multilayer tube of claim 1 wherein said middle layer is further comprising about 1-49 wt % elastomer.

4. The multilayer tube of claim 1 in a transmission cooling system at temperatures from about −40 C to 150 C.

5. The multilayer tube of claim 1 in an automotive heating and cooling system from about ~~40 C to 130 C.

6. The multilayer tube of claim 1 having a smooth bore or a corrugated surface.

7. A multilayer tube comprising
an outer layer comprising an aliphatic polyamide;
a middle layer of aliphatic polyamide comprising from 20-90% of a combined thickness of three layers within said multilayer tube and an inner layer comprising a polyamide polymer selected from PA610, PA612, PA1010, and PA1012 and wherein a layer of adhesive is located between said inner layer and said middle layer.

8. A multilayer tube comprising
an outer layer comprising an aliphatic polyamide;
a middle layer of PA6 wherein said middle layer comprises from 20-90% of a combined thickness of three layers within said multilayer tube and
an inner layer comprising PA610 and wherein a layer of adhesive is located between said inner layer and said middle layer.

\* \* \* \* \*